United States Patent
Le et al.

(10) Patent No.: US 7,372,840 B2
(45) Date of Patent: May 13, 2008

(54) FILTERING OF DYNAMIC FLOWS

(75) Inventors: Frank Le, Irving, TX (US); Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 10/822,874

(22) Filed: Apr. 13, 2004

(65) Prior Publication Data

US 2005/0111382 A1 May 26, 2005

Related U.S. Application Data

(60) Provisional application No. 60/524,640, filed on Nov. 25, 2003.

(51) Int. Cl.
*H04Q 7/24* (2006.01)
*G06F 15/16* (2006.01)
*H04L 12/28* (2006.01)

(52) U.S. Cl. ............ 370/338; 370/224; 370/228; 370/352; 370/353; 709/224; 709/229; 709/230

(58) Field of Classification Search ......... 370/224, 370/228, 352, 353, 338; 709/202, 223–228
See application file for complete search history.

(56) References Cited

U.S. PATENT DOCUMENTS 6,789,112 B1 * 9/2004 Freeman et al. ............ 709/223

(Continued)

FOREIGN PATENT DOCUMENTS

WO  WO 02/103981 A2  12/2002

(Continued)

OTHER PUBLICATIONS

3GPP TS 23.228 V6.3.0 "3rd Generation Partnership Project; Technical Specification Group Services and System Aspects; IP Multimedia Subsystem (IMS); Stage 2" Sep. 2003; pp. 1-158.

(Continued)

*Primary Examiner*—Hassan Kizou
*Assistant Examiner*—Venkatesh Haliyur
(74) *Attorney, Agent, or Firm*—Squire, Sanders & Dempsey, L.L.P.

(57) ABSTRACT

Methods and correspondent nodes to filter IP communications through firewalls in scenarios where dynamic pinholes are created to ensure an appropriate level of security is disclosed. The invention is based on creating a secure and authorized anchor for communications where all the communications are routed through before a firewall performs the packet filtering. A Translator Gateway (TrGW) switches addresses in the header according to a stored Mapping Table and an interface between a CPS (or a SIP proxy) and the TrGW. This interface allows the CPS to request the TrGW to provide bindings data between IP addresses upon session initiation, the TrGW to provide the bindings data to the CPS and the CPS to release the bindings at session release. The firewall accepts incoming packets whose IP address belongs to the pool of addresses of the TrGW. Thus any incoming packet that does not correspond to an existing call will be dropped at the TrGW, and a valid packet will go through the firewall which will verify that the packet is not a malformed message or other attack.

20 Claims, 8 Drawing Sheets

U.S. PATENT DOCUMENTS

| | | | |
|---|---|---|---|
| 6,954,790 B2 * | 10/2005 | Forslow | 709/227 |
| 7,072,332 B2 * | 7/2006 | D'Souza | 370/352 |
| 7,146,418 B2 * | 12/2006 | Bahl | 709/224 |
| 2002/0151312 A1 * | 10/2002 | Rosemarjin Bos et al. | 455/452 |
| 2003/0217096 A1 * | 11/2003 | McKelvie et al. | 709/202 |

FOREIGN PATENT DOCUMENTS

WO    WO 2004/114631 A1    12/2004

OTHER PUBLICATIONS

3GPP TSG SA WG2 Meeting #33 "Correction of WLAN Tunneling Requirements" Sophia-Antipolis, France, Jul. 7-11, 2003; S2-032347; 1 page.

Srisuresh P. et al., "*Middlebox Communication Architecture and Framework*", RFC 3303, IETF Network Working Group, August 2002, XP015009080, pp. 1-35.

El Malki K. et al., "*IPv6-IPv4 Translators in 3GPP Networks*", Internet Draft, IETF Network Working Group, Jun. 17, 2003, XP015000808, pp. 166.

"*Digital cellular telecommunications system (phase 2+); Universal Mobile Telecommunications System (UMTS); Achitectural requirements (3GPP TS 23.221 v5.7.0 Release 5)*", ETSI TS 123 221 v5.7.0, Dec 2002, pp. 1-20.

Stiemerling, M., "*Middlebox Configuration Protocol Design*", IP Operations and Management, 2002 IEEE Workshop, Oct. 29, 2002, pp. 222-226.

Umschaden, K., "*End to End Security for Firewall/NAT Traversal within the Session Initiation Protocol (SIP)*", Internet Engineering Task Force, Oct. 2003, pp. 1-37.

"3rd Generation Partnership Project; Technical Specification Group Services and System Aspects; IP Multimedia Subsystem (IMS); Stage 2 (Release 6)" (3GPP TS 23.228 v6.3.0 (Sep. 2003)).

* cited by examiner

FILTERING OF DYNAMIC FLOWS

REFERENCE TO RELATED APPLICATIONS

This application claims priority of U.S. Provisional Patent Application Ser. No. 60/524,640, filed on Nov. 25, 2003, the contents of which are hereby incorporated by reference.

FIELD OF THE INVENTION

The present invention relates to the filtering of dynamic flows, and more particularly, to a filtering node, an anchor node used in connection with the filtering, a method for configuring such an anchor node, and a corresponding method of communicating data.

BACKGROUND OF THE INVENTION

Recently, communication networks have widely spread and are used in every day life by many users. Among such communication networks, so-called packet switched communication networks find increasing attention. Packet switched networks transmit/receive data in units of packets. A packet consists of a header carrying control information such as (among others) for example a packet's address information (source/destination) as well as of a payload section carrying the actual data such as voice or the like.

Various protocols exist for such packet switched communication. For the purpose of the present invention, however, as an example of such protocols, IPv4 and/or IPv6 are described (which are versions of the well known Internet Protocol IP). Notwithstanding this, other packet switched protocols are useable in connection with the present invention. Also, non-packet switched protocols can be used in connection with the present invention, as long as the source/destination are identifiable by means of addresses.

Communication networks normally form part of a communication network system in which networks of plural operators cooperate with each other. Also, an individual network may consist of plural so-called domains of a network with the network as such being operated by a network operator, but the domains being e.g. controlled by a respective third party (different from the network operator), being operated on a different protocol, or having a different address space definition, or the like. Thus, for the purpose of the present invention, when communication networks are concerned, it is not distinguished between different networks or different domains, but communication networks are intended to cover all possible alternatives of the above outlined network constitution. Rather, a communication network could be regarded as a communication network system.

In connection with such communication networks or network systems, respectively, security issues become more and more important.

Normally, a communication is established/ongoing between two terminals. A communication originating terminal is referred to as first terminal or user equipment UE, and a communication destination terminal is referred to as correspondent node CN or second terminal. Of course, in a bidirectional communication, the correspondent node CN also acts as a user equipment UE when responding to the originating terminal. Technically, there need not be any difference between the terminals, but nevertheless, the terminals may be different from a technical point of view. Any difference, however, does not matter as long as the terminals are adapted to communicate with each other by means of the intermediate communication network.

In case a communication is or has been established between two terminals, the communication is identified by the source and destination addresses of the terminals. Also, as the communication may involve different contents or types of traffic to be exchanged between the terminals such as real-time traffic and non-real time traffic, a respective traffic is associated to a respective port. A port or port number thus represents a refinement of the address information used in the communication.

Unused addresses or even port numbers, however, constitute a possibility for attackers to establish a fraudulent or misbehaving communication to a user's terminal who does not actually wish to have such a communication.

Therefore, security issues in communication networks become more and more important. So-called firewalls FW play an important role for guaranteeing security in communication networks. A firewall can thus be regarded as a filtering node in a communication network which filters un-authorized traffic and prevents such traffic to reach a terminal which did not authorize such traffic to be received.

This invention is related to such security issues and filtering nodes or firewalls, respectively. It is more particularly related to the dynamic configuration of pinholes in firewalls and to the support of real-time services in communication. The expression "pinhole" as used in the present invention denotes a temporarily valid permission for a specific traffic to reach a specific terminal, which permission is granted or rejected by the firewall. An open pinhole thus represents the granted permission, whereas a closed pinhole represents the rejected permission.

In many frameworks of communication networks, there is the need to dynamically open and close pinholes in firewalls. For example, SIP (Session initiation protocol) established communications require pinholes to be dynamically created for the media stream (i.e. UDP/RTP for real-time services (User datagram protocol, real time protocol), TCP (transmission control protocol) for Instant Messaging) to pass through the firewall and for data packets to be exchanged between the communicating nodes (originating terminal and correspondent node terminal). These pinholes should then be removed (i.e. closed) at the termination of the communication to avoid possible attacks.

Subsequently, the architecture and more particularly the network entities as well as the interfaces that have been introduced and adopted in 3GPP ($3^{rd}$ generation partnership project) networks for the interworking of IPv6 with IPv4 domains are briefly described with reference to FIG. 1. This shows that the present invention as described in the following sections does not introduce new entities but re-uses an existing communication network architecture and the thus adopted framework in an innovative way.

The architecture as illustrated in FIG. 1 has been recently adopted in 3GPP for the interworking of IPv6 and IPv4 domains. However, this description serves as an example only and the present invention is not limited to Ipv4/IPv6 domains but is intended to cover also situations in networks within a single domain. Also, the functionality of the entities and interfaces that have been introduced are briefly outlined.

The subsequent sections will then explain how the present invention re-uses the currently already existing infrastructure in an innovative way to solve the firewall traversal problem.

Now, as is derivable from FIG. 1:

The current interworking architecture relies on a Translator Gateway: The TrGW is a gateway that converts the IP headers as needed, more generally, converts or translates address information included in the packets to be transmitted.

The current interworking architecture also relies on an IMS (IP Multimedia Subsystem) Application Layer Gateway (ALG): The IMS ALG's functionality is to provide the necessary application function for SIP/SDP protocol stack in order to establish communication between IPv6 and IPv4 SIP applications (Session Initiation Protocol/Session Description Protocol).

The IMS ALG receives an incoming SIP message from CSCF nodes (Call state control function, there are defined a S-CSCF, Serving CSCF and an I-CSCF, Interrogating CSCF) or from an IPv4 SIP network domain (CSCF's such as a (proxy) P-CSCF, S-CSCF, or I-CSCF are also referred to as SIP server in this application). This domain can be an external domain but may also be an internal domain of the communication network. The IMS ALG then changes the appropriate SIP/SDP parameters, translating the IPv6 addresses to IPv4 addresses and vice versa. Note that for the present invention, the protocols IPv4/IPv6 are only examples and other protocol transitions are conceivable.

The IMS ALG modifies the SIP message bodies and the headers that include the IP address. The IMS ALG will request NA(P)T-PT (Network Address (and Port) Translation-Protocol Translation) to provide the bindings data between the different IP addresses (IPv6 to IPv4 and vice versa) upon session initiation, and will release the bindings at session release. The NA(P)T-PT is thus a kind of a stateful translator and maintains an IPv6/IPv4 mapping table.

An Ix interface between the TrGW and the IMS ALG has also been introduced and adopted. Such interface shall allow:

the IMS ALG to request the NA(P)T-PT to provide the bindings data between the different IP addresses (IPv6 to IPv4 and vice versa) upon session initiation, the TrGW to provide the bindings data to the IMS ALG, and the IMS ALG to release the bindings at session release.

Furthermore, FIG. 1 depicts a user equipment UE operating based on IPv6 (which communicates with a correspondent node (not shown) CN operated based on IPv4. Also, a Proxy-CSCF (P-CSCF) is illustrated which receives a "first hop" signaling information from the user equipment UE when initiating a communication or session. The I-CSCF and S-CSCF can be regarded as a so-called call processing server CPS which represents an example of a communication management node. Additionally, a domain name server DNS and home subscriber server HSS form part of the architecture. The above described entities are mainly involved in the signaling and communication management as indicated by the dotted line which indicates signaling traffic, whereas the payload data is transmitted from the user equipment UE via the IP-CAN (IP Connectivity access network) through the translator gateway TrGW towards the communication partner, i.e. the correspondent node (not shown), as indicated by the bold line denoted "bearer" in FIG. 1.

As persons skilled in the art are considered to be familiar with the general architecture and the entities/nodes with the individual functions thereof, a further detailed description is omitted here.

Firewalls filter IP packets based on filtering rules, typically considering the source and destination IP addresses, the protocol type and/or the port numbers. In order to avoid attacks, firewalls are configured with filtering rules. Such rules include static rules (e.g. to stop TCP flooding or specific protocols) and dynamic rules (pinholes). Several applications require dynamic pinhole configuration in the firewall. As an example, SIP communications require dynamic creation/removal (i.e. opening/closing) of pinholes in the firewall for the media stream to pass the firewall while blocking attacks (UDP flooding, etc.) More generally, UDP (user datagram protocol) based applications require dynamic pinholes to be opened/closed when the communication starts/stops. Note that the description of SIP serves as an example only and that other protocols may also be used in connection with the present invention, such as e.g. WAP (Wireless Application Protocol), or the like.

Hitherto, several solutions have been proposed for dynamic pinhole control in firewalls, which are briefly introduced below:

1. The Use of Fake UDP Packets:

According to this approach, the user equipment UE sends a dummy UDP packet and the firewall FW opens the pinhole based on such packet. However, there is no way for the firewall FW to determine when the pinholes should be closed (since UDP communication does not have a session establishment/tear down as TCP does). Alternatively, the user equipment UE can send dummy UDP packets to create the pinhole in the firewall FW and will maintain sending such dummy UDP packets by a periodic transmission of such packets. Such method however presents two major problems: (1) the user equipment UE does not have any knowledge concerning timers of the state created in the firewall FW and (2) this may result in a high number of bytes to be sent over the wireless link, thus wasting resources.

2. The Use of a Firewall FW Which is Aware of e.g. SIP:

A SIP aware FW which will parse the SIP signaling and open/close the pinholes as required. This, however, requires SIP signaling to be visible at the firewall, while, however, SIP compression may be applied (e.g. in 3GPP and 3GPP2 IMS) and the firewall FW may not be capable to decompress it. Moreover, this solution gives too much control to the firewall FW, and the network operator at least partly looses control (whereas it is generally preferable to maintain the control in one's own products and/or networks). Finally, this solution cannot be applied when IPsec (Internet Protocol (IP) security) or TLS (transport layer security) encryption is applied to protect the SIP.

3. The Use of an Interface Between the Firewall FW and the Application Server (e.g. SIP Server in IMS):

Although such interfaces are being defined (e.g. MID-COM in IETF (MIDCOM: Middlebox Communication as being under definition by IETF, Internet Engineering Taskforce), they are still in an early specification stage, the standardization work may require some time and their availability in products is far away, whereas systems (e.g. IMS) need to be deployed before the firewall FW will support such interfaces. Moreover, although this solution allows for the control to be in a manufacturer's products (e.g. SIP server), the deployment is not fully independent from products from other companies.

4. A Signaling Protocol from the Terminal UE to the FW in Order to Perform Configuring of the FW:

The TIST protocol (topology insensitive service transversal), the CASP protocol (cross application signaling protocol) and other contributions are suggesting a signaling protocol from the terminal opening and closing the necessary pinholes in the firewalls in the network. These methods are however still individual drafts and it will take a very long time before such solutions will become standardized.

SUMMARY OF THE INVENTION

Therefore, it is an object of the present invention to provide an alternative solution for the problems associated with dynamic pinholes, which solution enables a short term deployment and which is free from the drawbacks associated with the above outlined proposals.

According to the present invention, this object is for example achieved by:

a method for configuring an anchor node in a communication network, the method comprising the steps of requesting for initiating a communication session for a first terminal via a communication management node of said communication network, first establishing, at an anchor node, a binding for the first terminal upon request by said communication management node, forwarding said request for initiating from said communication management node based on the established binding towards a second terminal, acknowledging said request by said second terminal to said communication management node, second establishing, at said anchor node, a binding for the second terminal upon request by said communication management node.

According to favorable further developments of the method, said step of requesting for initiating comprises a step of indicating, to said communication management node, at least the addresses of the terminals to be involved in the communication session;

said step of indicating further comprises informing a port number for said communication session of said first terminal;

said steps of establishing a binding comprise the step of associating an alias to said respective terminal;

said steps of establishing a binding further comprise the step of storing the associated alias for the respective terminal at said anchor node;

said step of acknowledging further comprises a step of informing a port number for said communication session of said second terminal;

the method further comprises a step of notifying said first terminal of the initiation of the session using the binding for said second terminal;

the method further comprises steps of requesting for terminating a communication session for a first terminal via a communication management node of said communication network, forwarding said request for terminating from said communication management node based on the established binding towards a second terminal, acknowledging said request by said second terminal to said communication management node, and first releasing, at the anchor node, the binding for the first terminal upon request by said communication management node, second releasing, at said anchor node, the binding for the second terminal upon request by said communication management node;

said steps of releasing comprise a step of deleting the associated alias for the respective terminal at said anchor node.

Also, according to the present invention, this object is for example achieved by:

a method of communicating data in an established communication session between a first and a second terminal in a communication network, wherein the method comprises the steps of transmitting the data to be communicated from the first terminal to an anchor node, the anchor node being configured to store a table of respective bindings for the terminals, relaying the data to be communicated from the anchor node towards a filtering node of said network using the configured bindings for the terminals, and filtering, at said filtering node, said data to be communicated based on the bindings for said terminals.

According to favorable further developments of the method, said step of filtering further comprises passing said data to be communicated through said filtering node onwards to the second terminal based on the binding, if such binding exists among the configured bindings;

said step of filtering further comprises blocking said data from being communicated through said filtering node onwards to the second terminal based on the binding, if such binding does not exist among the configured bindings, said step of relaying comprises a step of address translation based on the configured binding.

Also, according to the present invention, this object is for example achieved by:

an anchor node in a communication network, comprising a receiver first receiving a binding request for establishing a binding for a first terminal requesting for communication session initiation from a communication management node, a processor first establishing a binding for said first terminal in response to said received binding request and returning said binding to said communication management node, said receiver secondly receiving a binding request for establishing a binding for a second terminal to be involved in the communication session, from the communication management node, and said processor secondly establishing a binding for the second terminal upon request by said communication management node.

According to favorable further developments of the anchor node said processor comprises an allocating device associating an alias to said respective terminal when establishing the binding;

said anchor node comprises a memory storing the associated alias for the respective terminal.

Also, according to the present invention, this object is for example achieved by:

an anchor node in a communication network, comprising a receiver receiving data to be communicated from the first terminal to a second terminal, a memory storing a table of respective configured bindings for the terminals, a processor relaying the data to be communicated towards a filtering node of said network using the configured bindings for the terminals.

According to a favorable further development of said anchor node said processor comprises an address translator which performs an address translation based on the configured binding.

Also, according to the present invention, this object is for example achieved by:

a filtering node in a communication network comprising a receiver receiving data to be communicated from the first terminal to a second terminal, from an anchor node maintaining bindings for the terminals, and a processor analyzing the bindings for said terminals, and a filter filtering said data dependent on the result of analysis.

According to favorable further developments of the filtering node said filter passes said data to be communicated onwards to the second terminal based on the binding, if such binding exists among the configured bindings at the anchor node;

said filter blocks said data from being communicated onwards to the second terminal based on the binding, if such binding does not exist among the configured bindings at the anchor node.

Thus, as has become apparent from the foregoing, this invention defines a method to securely filter IP communications through firewalls in scenarios where dynamic pinholes typically need to be created to ensure an appropriate level of security (e.g. UDP streams in SIP communications). The invention is based on the idea of creating a secure and authorized anchor for communications where all the communications are routed through before a firewall performs the packet filtering.

Accordingly, at least the following advantages are achieved with the present invention being implemented:

1. This invention does at least not require a specific FW configuration interface (from a terminal to the firewall), and also does not require an ALG in a FW);

2. This invention securely supports SIP established communications (users are protected against common IP threats such as the commonly known "TCP SYN flood", "Teardrop", etc.);

3. This invention does not have to be standardized, so the deployment of it is faster than with solutions to be standardized;

4. This invention does not require substantial modification to a current CPS (S-CSCF/I-CSCF) implementation, or to a SIP proxy server implementation in case such a solution is adopted;

5. This invention does not require any modification/upgrade to current infrastructure (terminals, IMS (IP Multimedia subsystem), etc.);

6. This invention has the further advantages of not depending on any external party nor standardization fora, and can therefore be completely developed by a single manufacturer.

As a result of this invention, all data traffic passes through the anchor node as e.g. the translator gateway TrGW, but this should not be that of an issue, since all data also anyway has to pass through the firewall. (Rather, the TrGW could be configured to be physically closely located to or within the firewall or vice versa.)

Thus, as outlined above, the present invention defines a method to filter communications such as IP-based communications through firewalls in scenarios where dynamic pinholes need to be created to ensure an appropriate level of security (e.g. UDP streams in SIP communications). The invention is based on the idea of creating a secure and authorized anchor for communications where all the communications are routed through before a firewall performs the packet filtering. The invention does not introduce new entities but re-use existing framework. The invention relies on TrGW (Translator Gateway) which functionality is to switch the IP addresses in the IP header according to the stored IP Mapping Table and an interface between the CPS (or a SIP proxy) and the TrGW.

This interface shall allow: the CPS to request the TrGW to provide bindings data between IP addresses upon session initiation, the TrGW to provide the bindings data to the CPS and the CPS to release the bindings at session release. The FW shall be a stateful one and, on the external interface, shall accept only incoming packets whose IP address belongs to the pool of addresses of the TrGW. Thus any incoming packet that does not correspond to an existing call or session will be dropped at the TrGW (preventing any flooding attempt), and valid packet will go through the FW which will verify that the packet is not a malformed message or other attack (e.g. TCP SYN flood, etc.)

BRIEF DESCRIPTION OF THE DRAWINGS

The above and further advantages will become more apparent upon referring to the following description in connection with the accompanying drawings in which.

DESCRIPTION OF EMBODIMENTS OF THE INVENTION

The present invention will now be described in detail with reference to the accompanying drawings.

For the purpose of the illustration of this invention, a SIP call with real-time streams is described. However, the method described in this document is not restricted to scenarios where SIP is used (e.g. 3GPP IMS) but may also be applied e.g. in WAP scenarios. Generally, it can also be applied in any other working environment where dynamic pinholes need to be created but firewall configuration interfaces are not present.

It will be recognized that the invention makes use of an anchor node such as a Translator Gateway (TrGW). The functionality of the anchor node is to switch the addresses such as IP addresses in the IP header according to the stored IP Mapping Table; its functionality is similar to the one of a network address translator NAT. Also, it will be seen that the invention makes use of an interface between the CPS (or a SIP proxy) and the TrGW. This interface shall allow: the CPS (or SIP proxy) to request the TrGW to provide bindings data between IP addresses (please see further explanation below) upon session initiation, the TrGW to provide the bindings data to the CPS (or SIP proxy), and the CPS (or SIP proxy) to release the bindings at session release.

Figure 1:
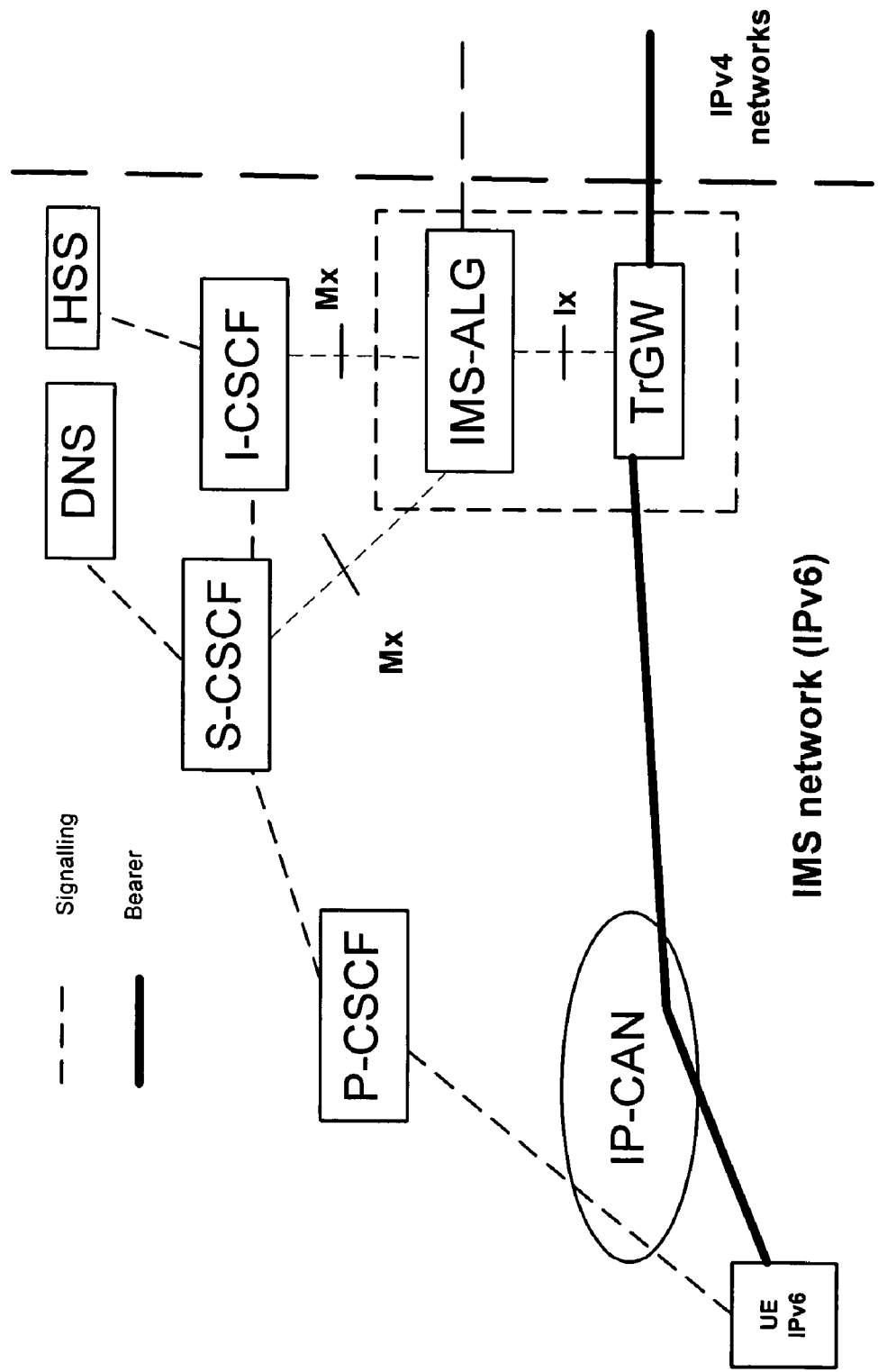
FIG. 1 illustrates the known architecture adopted in 3GPP for the interworking of IPv6 with IPv4 networks.
Figure 2:
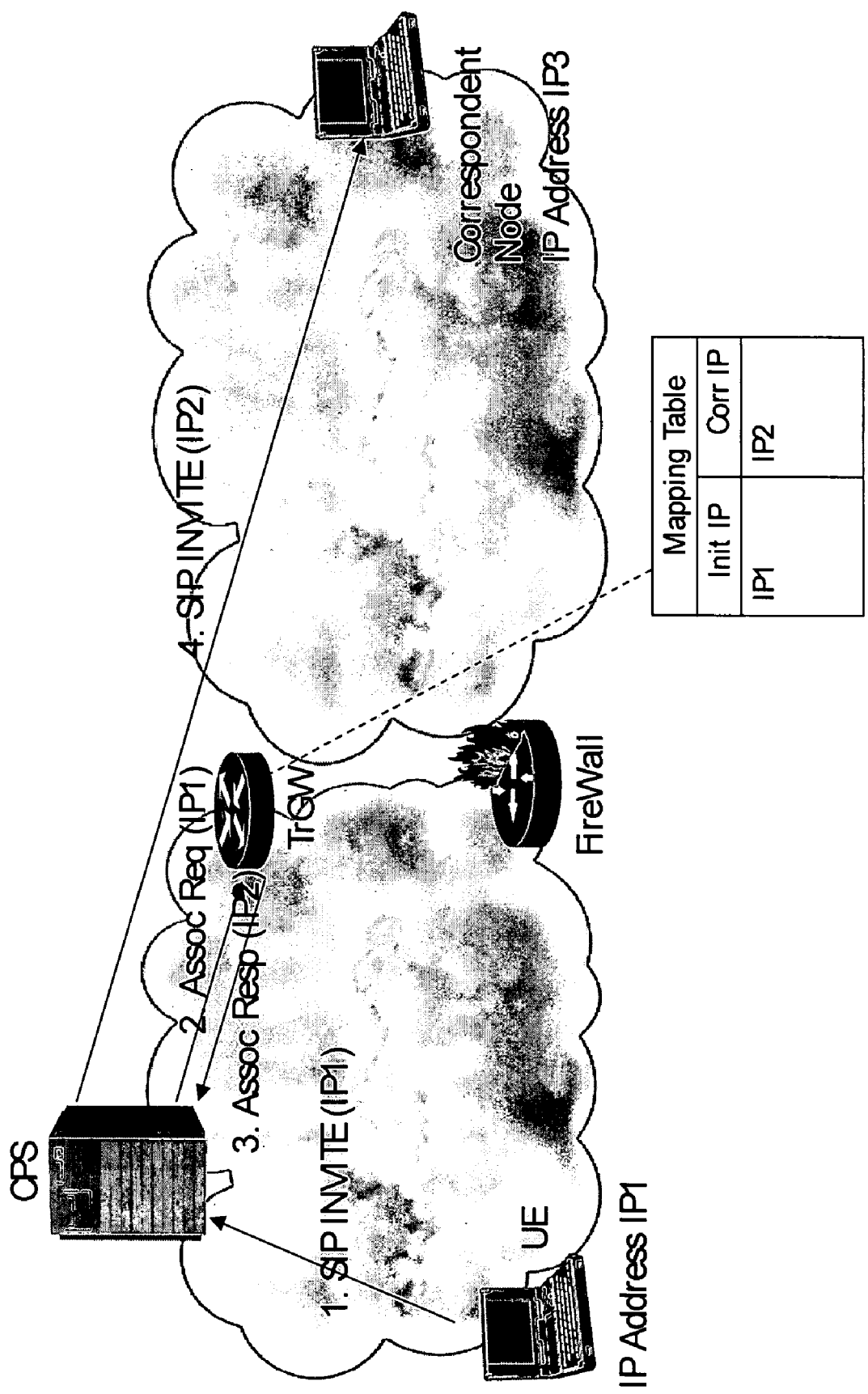
FIG. 2 illustrates the invention proposed in this document in relation to the configuration of an anchor node.

Firstly, with reference to FIG. 2, a method for configuring an anchor node in a communication network is described.

FIG. 2 illustrates a terminal UE as a communication originating terminal identified by its address IP1, a call processing server CPS as an example of a communication management node, a translator gateway TrGW as an instance of the anchor node, a firewall FW (to be described later) for use in communication once the anchor node has been configured, and a communication destination terminal, i.e. a correspondent node CN identified by its address IP3.

In a communication between the terminals, a logical association between the terminals exists which can be referred to as a call. Within such a call, data of different "contents" or traffic types, i.e. of different quality of service QoS, can be communicated such as real-time or non-real time traffic, or the like. A respective type of data/traffic is then communicated in a so-called session forming part of the call as such. A session is further identified not only by the terminal's addresses but in addition by a port number of the respective terminal, via which port number the traffic is guided/handled. The translator gateway maintains/stores a translation table or mapping table in which an IP address of a communication initiating terminal (InitIP) is associated to a corresponding IP address CorrIP (representing an alias for the terminal). Optionally (not shown), the mapping table does not only included terminal addresses but additionally also respective ports of a respective terminal.

Subsequently, the method for configuring the anchor node TrGW is described. The method comprises the following steps:

In a first step, 1., the UE sends a SIP Invite to its CPS, specifying the IP address IP1, as well as the port number where it expects the media stream in the SDP (Session Description Protocol) field. For the purpose of this illustration, let's call IP1 and Port#1 the IP address and port number where the UE expects the media stream. Stated in other words there occurs a requesting for initiating a communication session for a first terminal UE via a communication management node CPS of said communication network. Also, said step of requesting for initiating comprises a step of indicating, to said communication management node CPS, at least the addresses of the terminals UE, CN to be involved in the communication session, and said step of indicating further comprises informing a port number Port#1 for said communication session of said first terminal UE.

In a second step, 2., the CPS sends a requests to the TrGW providing the IP address of the UE i.e. IP__1. This request requests associating an IP address to the address of the requesting terminal to thereby establish a binding. The anchor node such as the TrGW then performs a first establishing, at the anchor node (TrGW), of a binding for the first terminal UE upon the request by said communication management node CPS.

This means that the TrGW associates another IP address (an alias), IP__2, to IP__1 and creates an entry in its Mapping Table to store this association. Optionally, the CPS may provide the port number Port#1 of the user equipment UE, and optionally the TrGW may assign another port number Port#2. This information is also stored in the mapping table, and can be used for higher granularity filtering of incoming data packets as it will be explained in the subsequent sections. Based on the binding provided by the anchor node TrGW, the CPS modifies the SDP field of the SIP invite: It more particularly substitutes IP__1 and optionally Port#1 with IP__2 and Port#2.

The TrGW then sends a reply to the CPS providing IP__2 as the binding address associated to IP1. This association response is illustrated by the step 3. in FIG. 2.

Thereafter, in step 4., there is a forwarding of said request for initiating from said communication management node CPS based on the established binding towards a second terminal CN, as the CPS sends the SIP invite to the correspondent node using the bound IP address IP2 associated for the user equipment UE.

In response thereto, (not shown in FIG. 2) the called party replies with e.g. a "SIP 200 OK" to the call management node CPS. Thus, there is an acknowledging of said request by said second terminal CN to said communication management node CPS.

The media stream capabilities of the destination are returned along the signaling path, in the "SIP 200 Ok" message in the above signaling flows. They could actually also be returned in a so-called "SIP 183 Session Progress provisional response", or even in another response.

Upon receiving e.g. the SIP 200 Ok, the CPS then requests a binding for the IP address, IP3 of the correspondent node (and optionally for the port number Port#3) of the called party specified in the SDP field at the anchor node TrGW. This represents a second establishing, at said anchor node, of a binding for the second terminal CN upon request by said communication management node.

The TrGW provides (in the second establishing) an address and optionally a port number, IP__4 and Port#4, that the CPS will specify in the SDP field of that SIP 200 Ok message which is finally returned to the terminal UE.

These steps are performed so that the called party CN "sees" a single IP address, i.e. IP__2, as the IP address of the calling party UE. In communication, all packets are to be routed via the anchor node TrGW which will perform the required address translations. Not having the above steps of establishing a binding for the address of the called terminal, the UE will send packets from IP1 to the CN whereas the SIP signaling will indicate IP2 as the originating address.

Subsequently, the call management node CPS forwards the SIP message to the terminal UE. From the point of view of the terminal UE, the called party CN is expecting the media stream at IP__4 and, optionally, e.g. Port#4. Thus, there is a step of notifying said first terminal UE of the initiation of the session, with the binding for said second terminal being used in the notification.

Sending the media stream at this IP address and Port number, the packets will arrive at the TrGW which will identify the binding associated with that flow.

Both of said steps of establishing a binding thus comprise a step of associating an alias to said respective terminal UE, CN; i.e. the terminals become "known" under a different address (and optionally port number) such as IP2 instead of IP1 and IP4 instead of IP3.

Also, the steps of establishing a binding further comprise the step of storing the associated alias for the respective terminal at said anchor node, for example in a memory of the anchor node in the form of a lookup table.

(Moreover, said step of acknowledging, as an option, further comprises a step of informing a port number Port#3 for said communication session of said second terminal CN.)

Thus, a mapping table is configured at the anchor node upon requesting for an initiation of a call or communication session.

Figure 8:
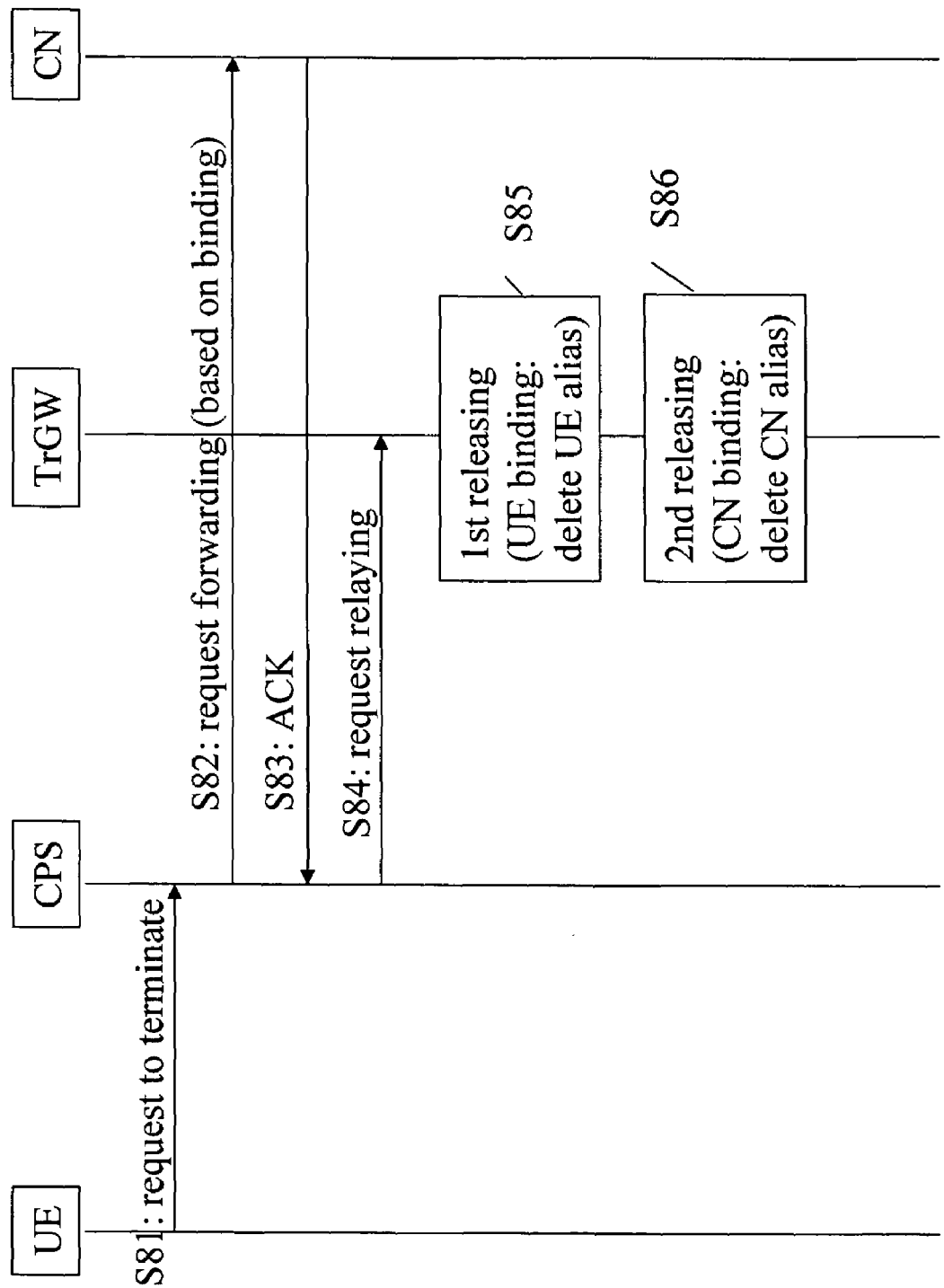
FIG. 8 illustrates a signaling in relation to a termination of a communication session.

Shown in FIG. 8 are the steps according to the present invention involved with the termination of a communication session. In this regard, the method further comprises a step S81 of requesting for terminating a communication session for the first terminal UE via a communication management node CPS of said communication network (the termination request may equally be originated by the correspondent node which then acts as the "first terminal"). This request for termination is then forwarded, S82, from said communication management node CPS based on the established binding towards the second terminal CN, which acknowledges, S83, said request to said communication management node CPS. The management node CPS relays, S84, that request to the anchor node TrGW.

Then, there occurs a first releasing, S85, at the anchor node TrGW, of the binding for the first terminal UE upon request (S84) by said communication management node CPS, and a second releasing, S86, at said anchor node TrGW, of the binding for the second terminal CN upon request (S84) by said communication management node. These steps of releasing comprise a step of deleting the associated alias for the respective terminal at said anchor node. This means that entries to the mapping table (shown in FIGS. 2, 3, and 4) are selectively erased.

Up to here, the configuration of the anchor node has been described. Subsequently, the communication using a thus configured anchor node will be described.

Generally, the method of communicating data according to the present invention relates to data in an established communication session between a first UE, CN and a second CN, UE terminal in a communication network. The method comprises the steps of transmitting the data to be communicated from the first UE, CN terminal to an anchor node TrGW, the anchor node being configured to store a table of respective bindings for the terminals. Then there is a relaying of the data to be communicated from the anchor node towards a filtering node such as a firewall FW of said network using the configured bindings for the terminals. Following this there is a filtering, at said filtering node, said data to be communicated based on the bindings for said terminals.

More specifically, the filtering further comprises passing said data to be communicated through said filtering node onwards to the second CN, UE terminal based on the binding, if such binding exists among the configured bindings. Also, the filtering further comprises blocking said data from being communicated through said filtering node onwards to the second CN, UE terminal based on the binding, if such binding does not exist among the configured bindings.

Figure 3:
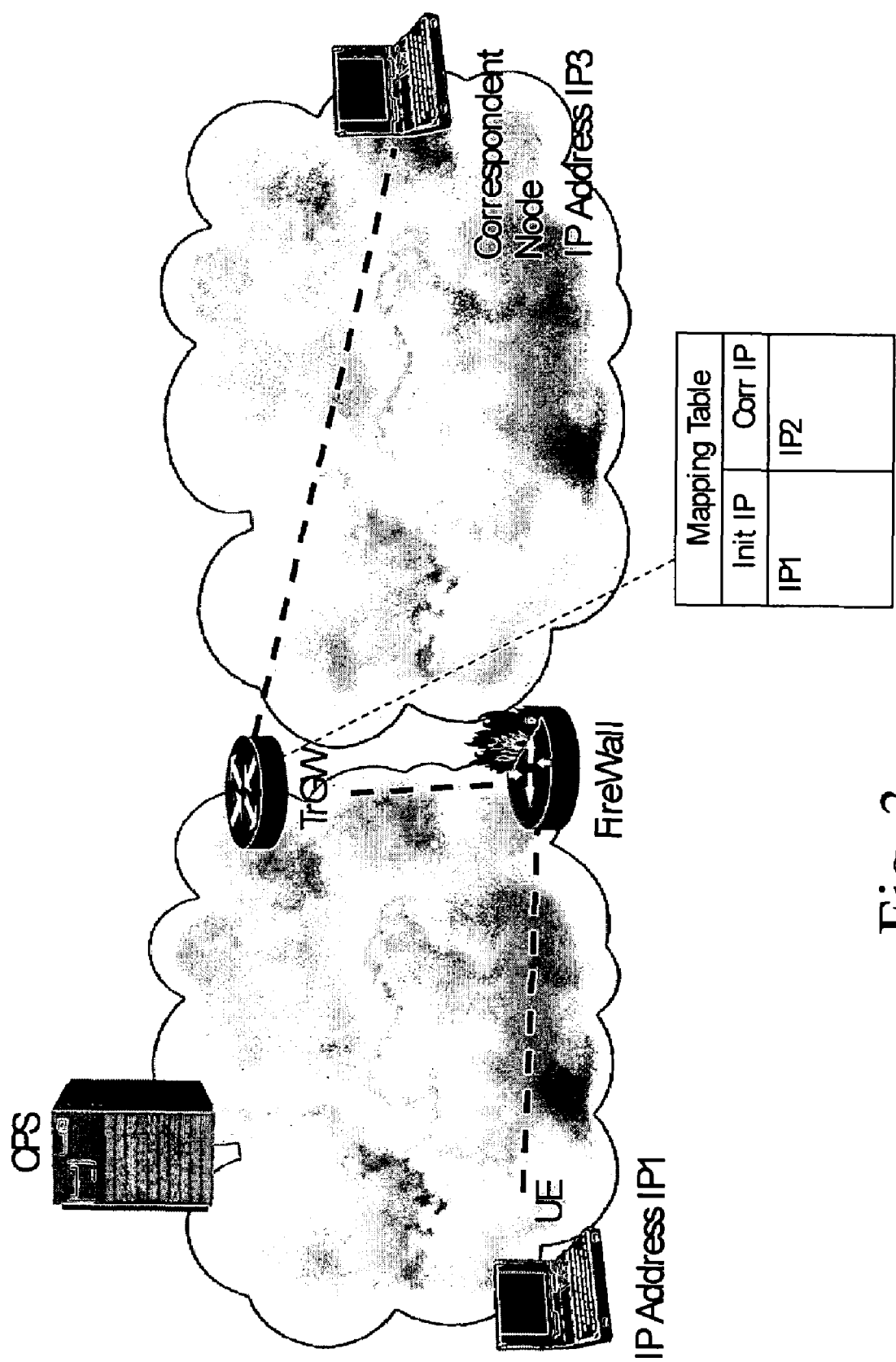
FIG. 3 describes the IP packet routing when the invention proposed in this document is applied in relation to the communicating of data.

With reference to FIG. 3 this means that once the anchor node has been configured as described above, as a next step, the traffic between the UE to the CN and the CN to the UE is routed—based on the configured bindings—as follows:

First Case (Downstream from UE to CN):

Data are routed from the UE to the TrGW, then from the TrGW to the FW and from there to the CN as described in the following (not shown FIG. 3).

Second Case (Upstream from CN to UE):

Data are routed from the CN to the TrGW, then from the TrGW to the FW and from there to the UE as described in the following (as shown FIG. 3).

This is now described in greater detail:

Payload data originating from the user equipment UE are forcedly routed to the anchor node. In case plural anchor nodes exist in the network, this may be achieved by associating an anchor node to a respective terminal, e.g. dependent on the address and/or location of the terminal or dependent on any other criteria, e.g. dependent on the traffic type concerned.

The anchor node TrGW modifies the IP header of the incoming packets such that it differs from the header of outgoing data packets as follows:

Source IP address is modified from IP_1 to IP_2

Destination IP address is modified from IP_4 to IP_3

Optionally, Source Port number is modified from Port#1 to Port#2

Optionally, Destination Port number is modified from Port#4 to Port#3.

And for incoming IP packets, the called party, i.e. the CN, sends IP packets as a response from its address IP_3 to the alias address IP_2 of the user equipment UE.

Also, these IP packets arrive at the anchor node TrGW which modifies the packets as follows:

Source IP address is modified from IP_3 to IP_4,

Destination IP address is modified from IP_2 to IP_1,

Optionally, Source Port number is modified from Port#3 to Port#4,

Optionally, Destination Port number is modified from Port#2 to Port#1.

In any case, in communication, packets with the modified header are forcedly routed to the filtering node such as a firewall. Namely, data emanating from the anchor node TrGW are forcedly routed to the firewall. In case plural firewalls exist in the network, this may be achieved by associating a firewall to a respective anchor node, e.g. dependent on the address and/or location of the anchor node, or dependent on any other criteria.

The firewall in turn is configured to let incoming packets from the IP addresses pool of the anchor node TrGW pass the Firewall and to block others. The firewall as a filtering node thus knows the address pool of the bindings existing for authorized communications.

This knowledge is obtained e.g. by informing the firewall by the anchor node of each newly established or deleted binding upon establishing or deleting the binding at the anchor node. Alternatively, in case of receiving packets, the firewall may query the anchor node to learn whether the addresses concerned are part of the address pool of the anchor node or not. Various other possibilities are conceivable in order that the firewall obtains the knowledge of the address pool of the anchor node.

Such communication method allows:

invalid data packets arriving at the firewall to be dropped, invalid data packets arriving at the anchor node TrGW to be dropped, e.g. an incoming IP packet not corresponding to an existing session is not even forwarded to the firewall, incoming packets from valid nodes to be delivered to the user equipments UE Incoming packets from valid nodes to be checked by the firewall against common IP threats (e.g. TCP SYN flood, Ping of death, etc.)

Optionally, in case the CPS provides the Port numbers and the IP address of the correspondent node when configuring the anchor node, this information could also be used when filtering incoming IP packets.

The only packets allowed to pass through the TrGW first and then the Firewall are those generated by legitimate CN (i.e. CNs in a SIP call with a UE in the network protected by the FW, otherwise the TrGW would drop them), directed to a legitimate IP address of a UE, and corresponding to protocol type allowed for the UE, and vice versa.

In order to implement the invention, the anchor node TrGW is configured as described above. Also the interface between the TrGW and the CPS is configured as described above. This interface can be based on LDAP (Lightweight Directory Access Protocol), or COPS (Common Open Policy Service) Protocol.

The extra functionality of the CPS (requests sent by the CPS to the TrGW, modification of the SIP messages) can either be added to current CPS implementations or implemented in a SIP Proxy server. The CPS will forward all SIP signaling to this SIP Proxy which will perform the operations described above.

Figure 4:
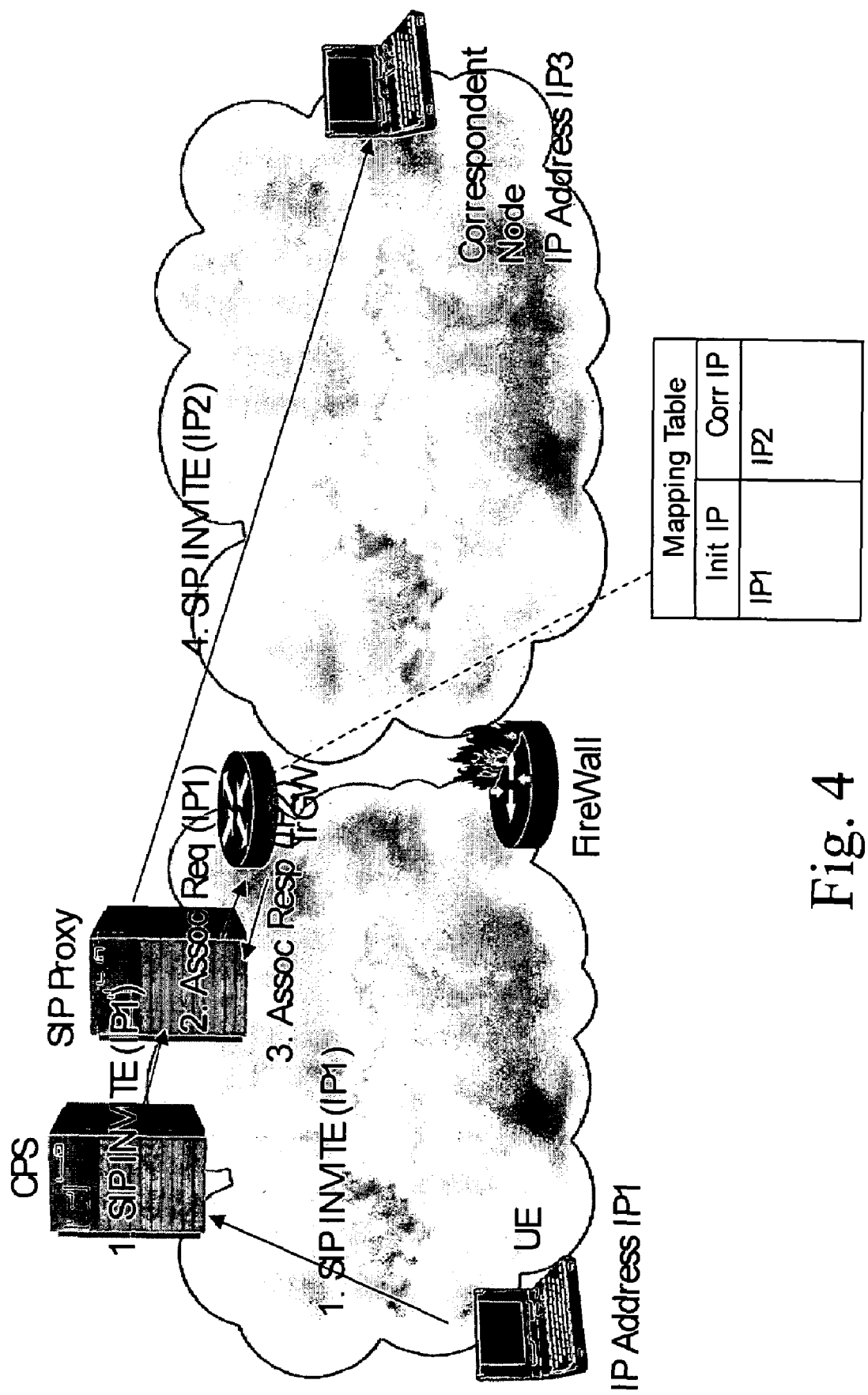
FIG. 4 describes a specific alternative method of implementing the invention in relation to the configuration of an anchor node.

This modification is illustrated in FIG. 4 of the drawings. The method flow is similar as the one in FIG. 2, but the functionality imparted to the CPS in FIG. 2 is transferred in this modification to the SIP proxy server located between the CPS and the anchor node. The CPS merely relays the request for initiating a communication session onwards to the SIP proxy server as an alternative communication management node, and relays respective responses/acknowledgements to the UE. A further detailed description thereof is therefore omitted here.

Thus, a communication security can be achieved by analyzing the SIP signaling and the data exchanged between the communicating nodes, more particularly by analyzing the indicated IP addresses (and optionally port numbers) which serve as the "dynamic rules" for the firewall.

Hereinbefore, the present invention has been described with reference to the methods involved. However, it is to be noted that the present invention also relates to the correspondingly adapted nodes.

Thus, it will be understood that in connection with the method of configuring an anchor node, an anchor node is constituted as follows.

Figure 5:
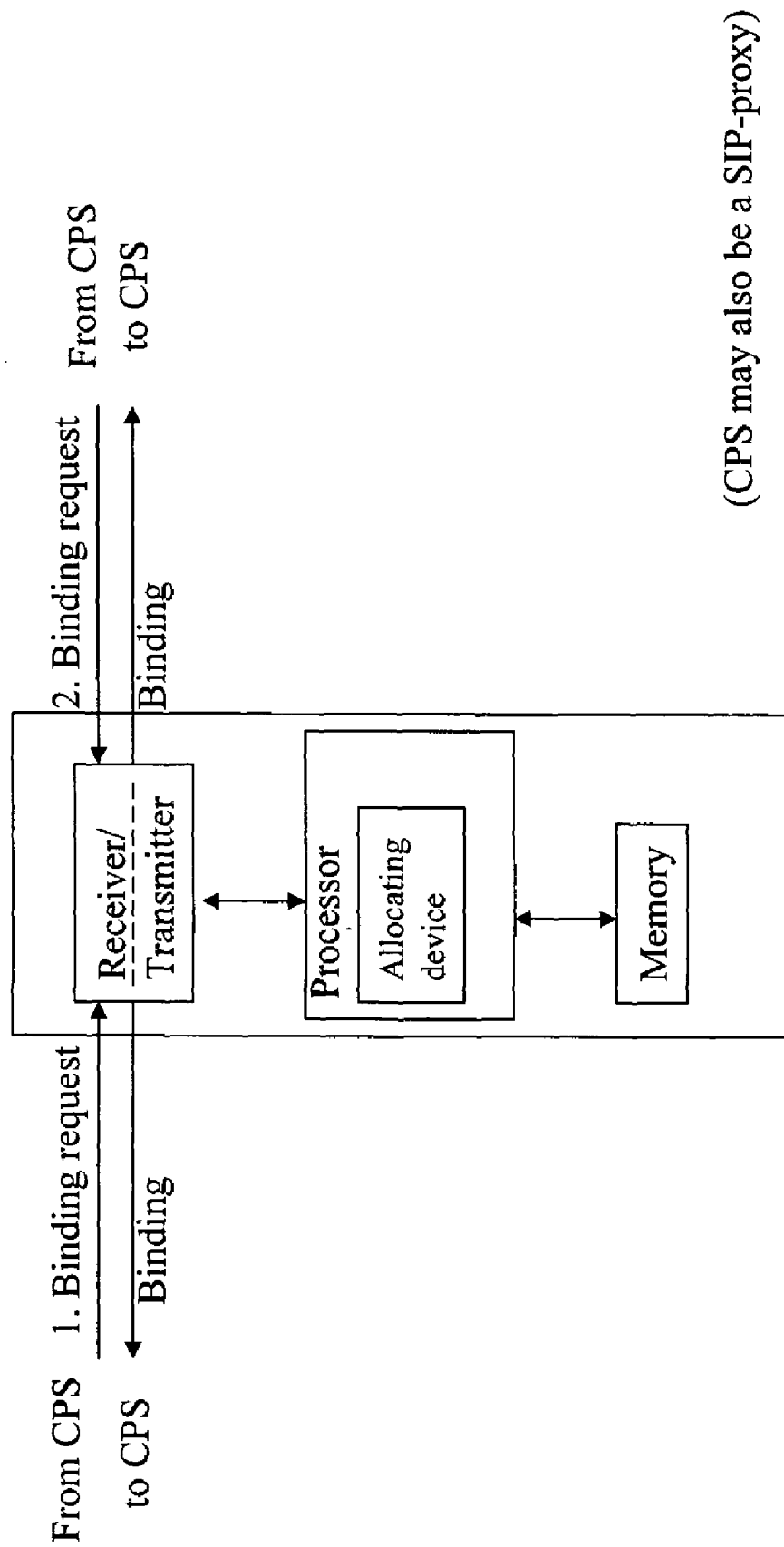
FIG. 5 illustrates an anchor node in relation to the configuration of the anchor node according to the present invention.

The anchor node according to the present invention and as shown in FIG. 5 comprises a receiver first receiving a binding request for establishing a binding for a first terminal requesting for communication session initiation from a communication management node, a processor first establishing a binding for said first terminal UE in response to said received binding request and returning said binding to said communication management node, and said receiver secondly receiving a binding request for establishing a binding for a second terminal to be involved in the communication session, from the communication management node, and said processor secondly establishing a binding for the second terminal CN upon request by said communication management node. It is to be noted that the receiver actually is a receiver/transmitter and the transmitter part returns the information regarding the established binding to the communication management node CPS (or Proxy-CSCF). Note that although FIG. 5 shows a distinct receipt of binding requests, this is for illustrative purposes only and both requests received at different times may of course be received via the same interface of the anchor node towards the communication management node CPS (or proxy-CSCF).

Further, the processor comprises an allocating device associating an alias to said respective terminal when establishing the binding as well, and the anchor node comprises a memory storing the associated alias for the respective terminal.

Further, it will be understood that in connection with the method of communicating, an anchor node is constituted as follows. In this connection, though different drawings illustrate the anchor node, it has to be noted that this is for illustrative purposes only. Actually, an anchor node according to the present invention is equipped with all internal devices/means at any time, while these are rendered operative selectively according to the operating state of the anchor node, i.e. when configuring the anchor node or when communicating via the anchor node. Also, a configuration may be performed between or during communication, as the processing device of the anchor node is preferably configured to allow for a parallel processing for configuring and communicating processing. Also, some components of the anchor node are not provide twice, but used for both purposes, configuring and communicating (e.g. receiver, memory).

Figure 6:
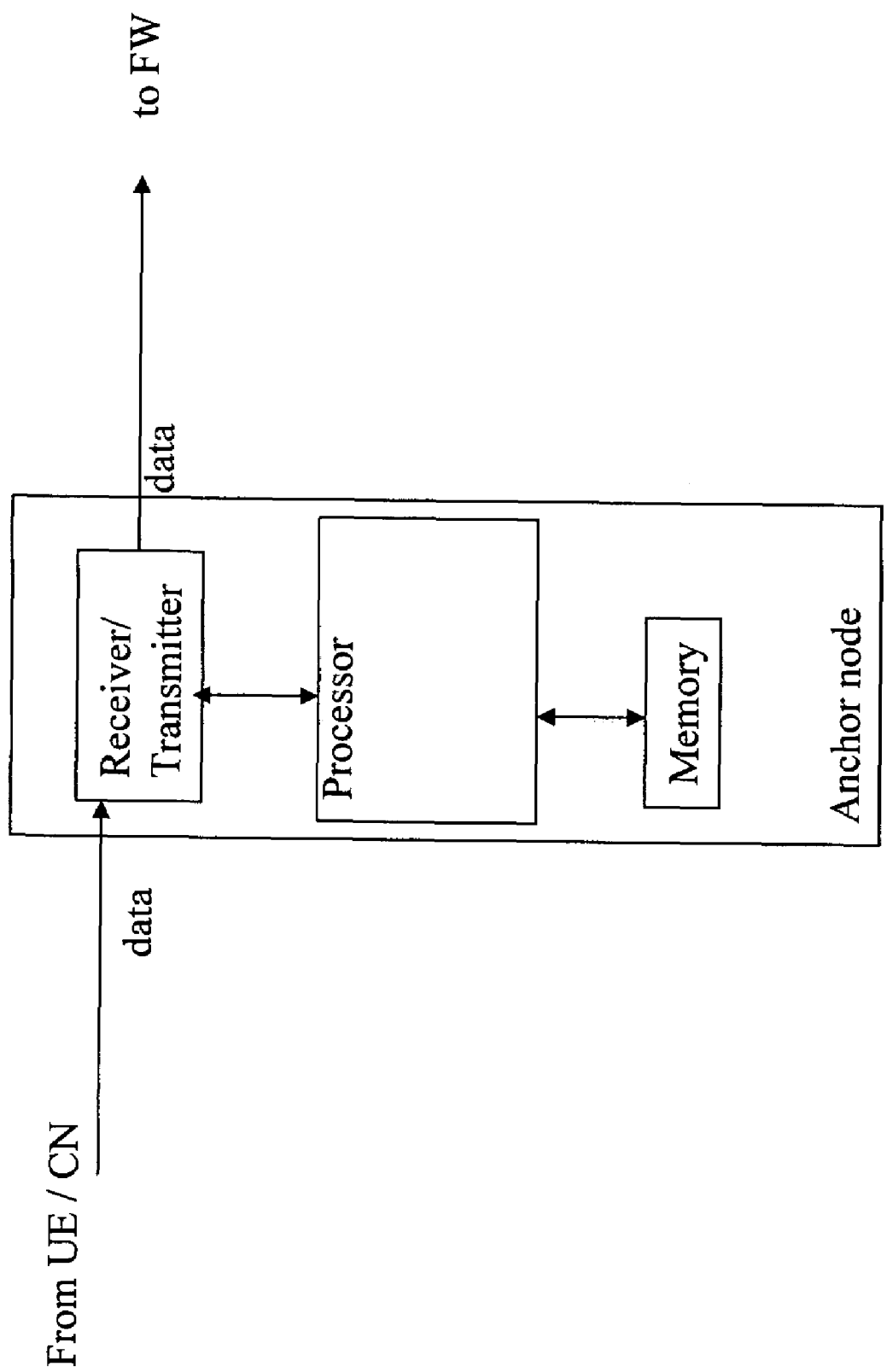
FIG. 6 illustrates an anchor node in relation to the communicating of data according to the present invention.

The anchor node according to the present invention and as shown in FIG. 6 comprises a receiver receiving data to be communicated from the first UE, CN terminal to a second terminal CN, UE, a memory storing a table of respective bindings for the terminals, a processor relaying the data to be communicated towards a filtering node FW of said network using the bindings for the terminals. Of course, the receiver actually is a receiver/transmitter and acts as transmitter in order to relay the data according to the processor's processing results. The processor in cooperation with the memory and the bindings stored therein, modifies the headers of the data as described before in connection with the communicating method. Note that the anchor node may only selectively perform a relaying of data to the firewall for those data/addresses for which it has a binding information, i.e. data associated to a terminal address for which no alias (binding) is stored in the anchor node can be prevented from being forwarded to the firewall. This means that the anchor node checks the bindings and sends only the valid packets according to the bindings to the filtering node, and insofar constitutes already part of the firewall functionality. Nevertheless, the same functionality can be attributed to the firewall itself.

Also, it will be understood that in connection with the method of communicating, a filtering node is constituted as follows.

Figure 7:
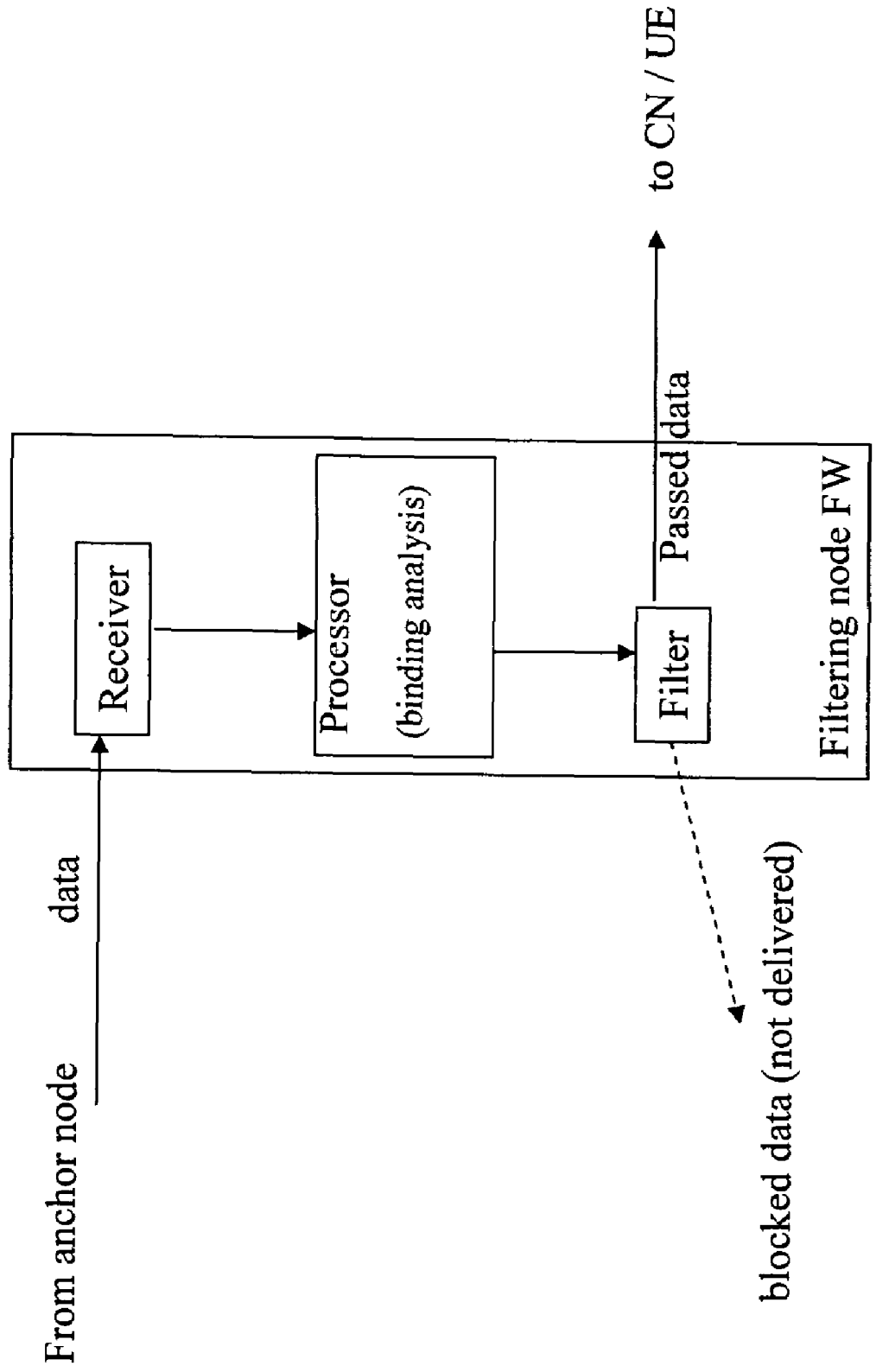
FIG. 7 illustrates a filtering node in relation to the communicating of data according to the present invention.

The filtering node according to the present invention and as shown in FIG. 7 comprises a receiver receiving data to be communicated from the first UE, CN terminal to a second terminal CN, UE, from an anchor node maintaining bindings for the terminals, and a processor analyzing the bindings for said terminals, and a filter filtering said data dependent on the result of analysis.

In particular, said filter passes said data to be communicated onwards to the second terminal CN, UE based on the binding, if such binding exists among the configured bindings at the anchor node, and said filter blocks said data from being communicated onwards to the second terminal CN, UE based on the binding, if such binding does not exist among the configured bindings at the anchor node. Blocked data are not delivered, but rather deleted or discarded. The filtering node thus checks that packets arriving at the filtering node from the anchor node, and therefore "seem" to be valid (e.g. due to having passed the anchor node), are not otherwise invalid.

It should be noted that the block circuit diagrams of the anchor node as well as of the filtering node are given without any specific implementation details. The nodes may be implemented in hardware such as a digital signal processor DSP or as an ASIC (application specific integrated circuit), or in software. Any implementation is possible, as long as the node performs the functionalities as described further above with reference to the specific methods/steps to be performed.

Accordingly, as has been described herein above, the present invention defines methods and correspondent nodes to filter IP communications through firewalls in scenarios where dynamic pinholes need to be created to ensure an appropriate level of security. The invention is based on creating a secure and authorized anchor for communications where all the communications are routed through before a firewall performs the packet filtering. The invention does not introduce new entities but re-use existing framework. The invention relies on a Translator Gateway TrGW switching addresses in the header according to a stored Mapping Table and an interface between a CPS (or a SIP proxy) and the TrGW. This interface shall allow: the CPS to request the TrGW to provide bindings data between IP addresses upon session initiation, the TrGW to provide the bindings data to the CPS and the CPS to release the bindings at session release. The FW shall be a stateful one and, on the external interface, shall accept only incoming packets whose IP address belongs to the pool of addresses of the TrGW. Thus any incoming packet that does not correspond to an existing call will be dropped at the TrGW, and valid packet will go through the FW which will verify that the packet is not a malformed message or other attack.

Even though the present invention has been described with reference to specific embodiments which were chosen as examples only, it should be understood that the above description and accompanying figures are intended to illustrate the present invention by way of example only. The preferred embodiments of the methods and nodes may thus vary within the scope of the attached claims.

The invention claimed is:

1. A method, comprising:
  configuring an anchor node in a communication network, wherein the configuring comprises:
    first requesting to initiate a communication session for a first terminal via a communication management node of said communication network,
    first establishing, at an anchor node, a binding for the first terminal upon request by said communication management node,
    forwarding said first requesting to initiate from said communication management node based on the established binding towards a second terminal,
    acknowledging said first requesting to initiate by said second terminal to said communication management node, and
    second establishing, at said anchor node, a binding for the second terminal upon request by said communication management node; and
  communicating data in the communication session between the first terminal and the second terminal, wherein the communicating comprises:
    transmitting the data to be communicated from the first terminal to the anchor node, the anchor node configured to store a table of respective bindings for the terminals, and
    relaying the data to be communicated from the anchor node towards a filtering node of said network using the configured bindings for the terminals, wherein the said filtering node filters said data to be communicated based on the bindings for said terminals.

2. A method according to claim 1, wherein said requesting to initiate comprises:
  indicating to said communication management node, at least the addresses of the terminals to be involved in the communication session.

3. A method according to claim 2, wherein said indicating further comprises:
  informing a port number for said communication session of said first terminal.

4. A method according to claim 1, wherein each of said first and second establishings of the bindings comprise:
  associating an alias to said respective terminal.

5. A method according to claim 4, wherein each of said first and second establishings of the bindings further comprise:
  storing the associated alias for the respective terminal at said anchor node.

6. A method according to claim 1, wherein said acknowledging further comprises:
  informing a port number for said communication session of said second terminal.

7. A method according to claim 1, further comprising:
  notifying said first terminal of the initiation of the session using the binding for said second terminal.

8. A method according to claim 1, further comprising:
  second requesting to terminate the communication session for the first terminal via the communication management node of said communication network,
  forwarding said second requesting to terminate from said communication management node based on the established binding towards the second terminal,
  acknowledging said second requesting to terminate by said second terminal to said communication management node,
  first releasing, at the anchor node, the binding for the first terminal upon request by said communication management node, and
  second releasing, at said anchor node, the binding for the second terminal upon request by said communication management node.

9. A method according to claim 8, wherein each of said first and second releasings:
  deleting the associated alias for the respective terminal at said anchor node.

10. A method according to claim 1, wherein said filtering further comprises:
  passing said data to be communicated through said filtering node onwards to the second terminal based on the binding, if such binding exists among the configured bindings.

11. A method according to claim 1, wherein said filtering further comprises:
  blocking said data from being communicated through said filtering node to the second terminal based on the binding, if such binding does not exist among the configured bindings.

12. An apparatus, comprising:
  a receiver configured to receive a first binding request for establishing a first binding for a first terminal requesting a communication session initiation from a communication management node, and
  configured to receive a second binding request for establishing a second binding for a second terminal to be involved in the communication session from the communication management node;
  a processor configured to establish the first binding for said first terminal in response to said received binding request and returning said binding to said communication management node and configured to establish the second binding for the second terminal upon request by said communication management node; and
  a memory configured to store a table of respective configured bindings for the terminals,
  wherein the receiver is further configured to receive data to be communicated from the first terminal to the second terminal, and
  wherein the processor is further configured to relay the data to be communicated towards a filtering node of said network using the configured bindings for the terminals.

13. An apparatus according to claim 12, wherein said processor comprises an allocating device configured to associate an alias to said respective terminal when establishing the binding.

14. An apparatus according to claim 13, further comprising;
a second memory configured to store the associated alias for the respective terminal.

15. A method according to claim 1, wherein said relaying comprises performing an address translation based on the configured bindings.

16. An apparatus according to claim 12, wherein said processor comprises an address translator configured to perform an address translation based on the configured bindings.

17. A system comprising:
first requesting circuitry configured to first request to initiate a communication session for a first terminal via a communication management node of a communication network;
first establishing circuitry configured to first establish, at an anchor node, a binding for the first terminal upon request by said communication management node;
forwarding circuitry configured to forward said first requesting to initiate from said communication management node based on the established binding towards a second terminal;
first acknowledging circuitry configured to acknowledge said first requesting to initiate by said second terminal to said communication management node;
second establishing circuitry configured to second establish, at said anchor node, a binding for the second terminal upon request by said communication management node;
a transmitter configured to transmit the data to be communicated from the first terminal to an anchor node, the anchor node configured to store a table of respective bindings for the terminals;
relaying circuitry configured to relay the data to be communicated from the anchor node towards a filtering node of said network using the configured bindings for the terminals; and
filtering circuitry configured to filter, at said filtering node, said data to be communicated based on the bindings for said terminals.

18. The system according to claim 17, further comprising:
second requesting circuitry configured to second request to terminate the communication session for the first terminal via the communication management node of said communication network;
forwarding circuitry configured to forward said second requesting to terminate from said communication management node based on the established binding towards the second terminal;
second acknowledging circuitry configured to acknowledge said second requesting to terminate by said second terminal to said communication management node;
first releasing circuitry configured to first release, at the anchor node, the binding for the first terminal upon request by said communication management node; and
second releasing circuitry configured to second release, at said anchor node, the binding for the second terminal upon request by said communication management node.

19. A system, comprising:
first requesting means for first requesting to initiate a communication session for a first terminal via a communication management node of a communication network;
first establishing means for first establishing at an anchor node, a binding for the first terminal upon request by said communication management node;
forwarding means for forwarding said first requesting to initiate from said communication management node based on the established binding towards a second terminal;
acknowledging means for acknowledging said first requesting to initiate by said second terminal to said communication management node;
second establishing means for second establishing at said anchor node, a binding for the second terminal upon request by said communication management node;
transmitting means for transmitting the data to be communicated from the first terminal to an anchor node, the anchor node configured to store a table of respective bindings for the terminals;
relaying means for relaying the data to be communicated from the anchor node towards a filtering node of said network using the configured bindings for the terminals; and
filtering means for filtering, at said filtering node, said data to be communicated based on the bindings for said terminals.

20. The system according to claim 19, further comprising:
second requesting means for second requesting to terminate the communication session for the first terminal via the communication management node of said communication network;
forwarding means for forwarding said second requesting to terminate from said communication management node based on the established binding towards the second terminal;
acknowledging means for acknowledging said second requesting to terminate by said second terminal to said communication management node;
first releasing means for first releasing, at the anchor node, the binding for the first terminal upon request by said communication management node; and
second releasing means, at said anchor node, the binding for the second terminal upon request by said communication management node.

* * * * *